Figure 1:
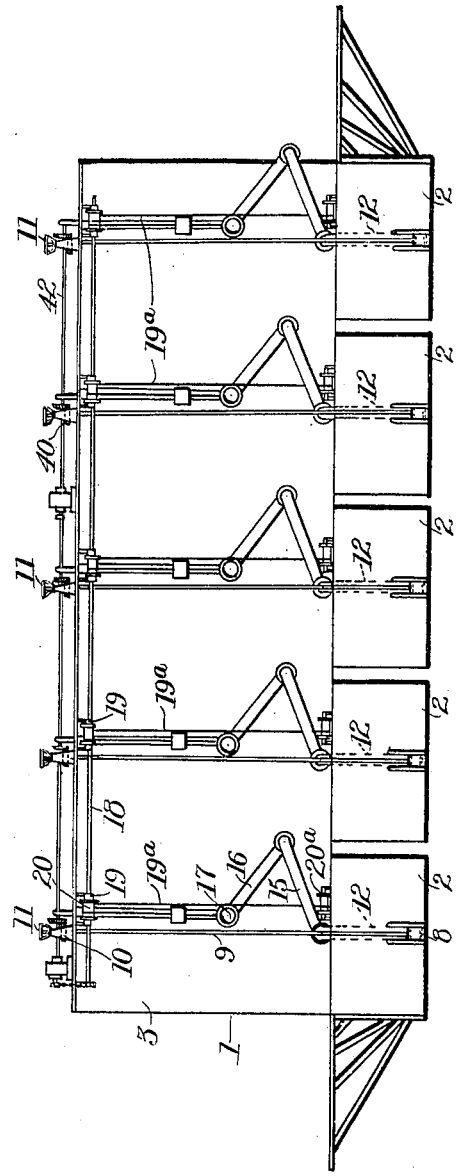

W. T. DONNELLY.
FLOATING DRY DOCK.
APPLICATION FILED JULY 28, 1908.

920,285.

Patented May 4, 1909.
6 SHEETS—SHEET 1.

Witnesses
Inventor
William Thomas Donnelly
By Blackwood Bros.
Attorneys

W. T. DONNELLY.
FLOATING DRY DOCK.
APPLICATION FILED JULY 28, 1908.
920,285.
Patented May 4, 1909.
6 SHEETS—SHEET 2.
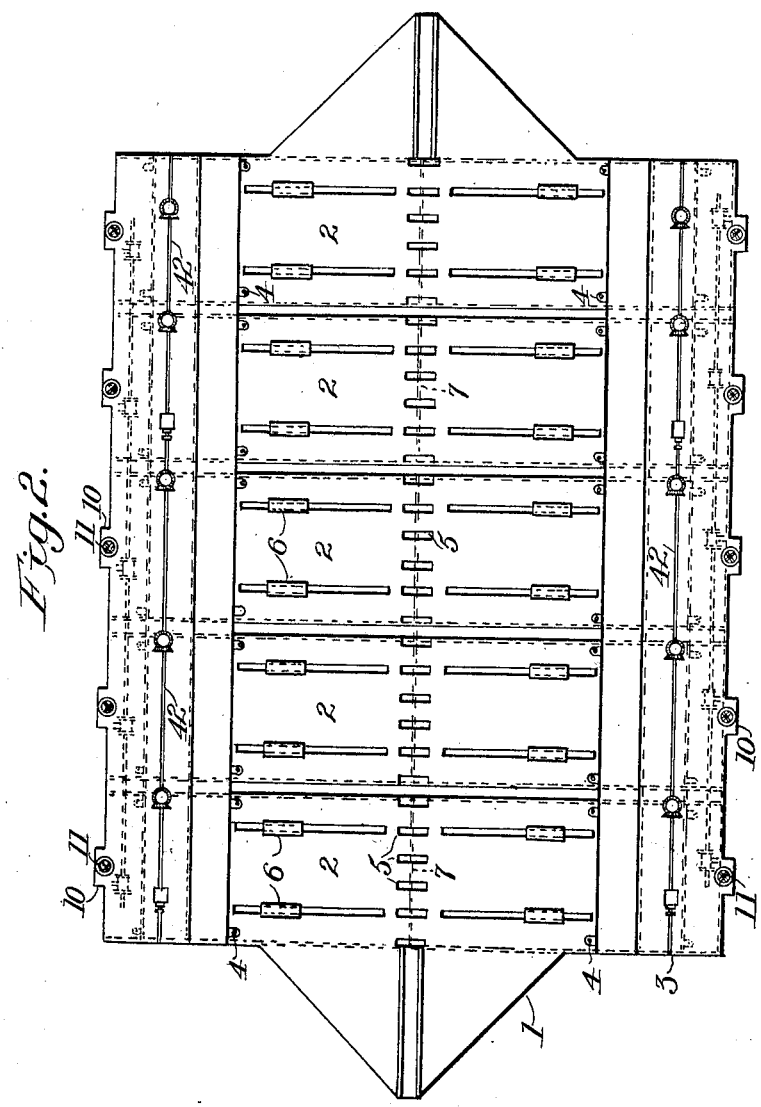

W. T. DONNELLY.
FLOATING DRY DOCK.
APPLICATION FILED JULY 28, 1908.
920,285.
Patented May 4, 1909.
6 SHEETS—SHEET 3.
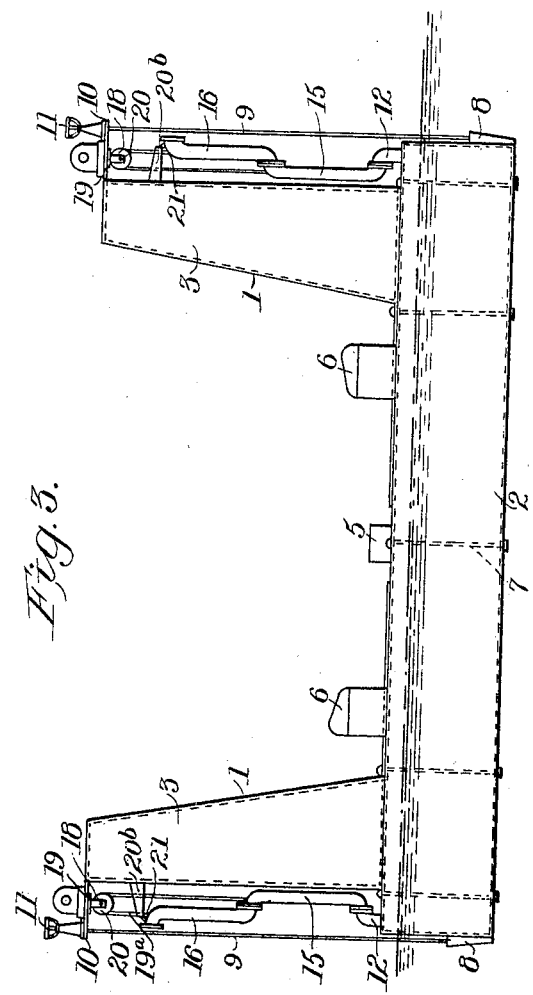
Witnesses
Inventor
William Thomas Donnelly
By Blackwood Bros.
Attorneys W. T. DONNELLY.
FLOATING DRY DOCK.
APPLICATION FILED JULY 28, 1908.
920,285.
Patented May 4, 1909.
6 SHEETS—SHEET 4.
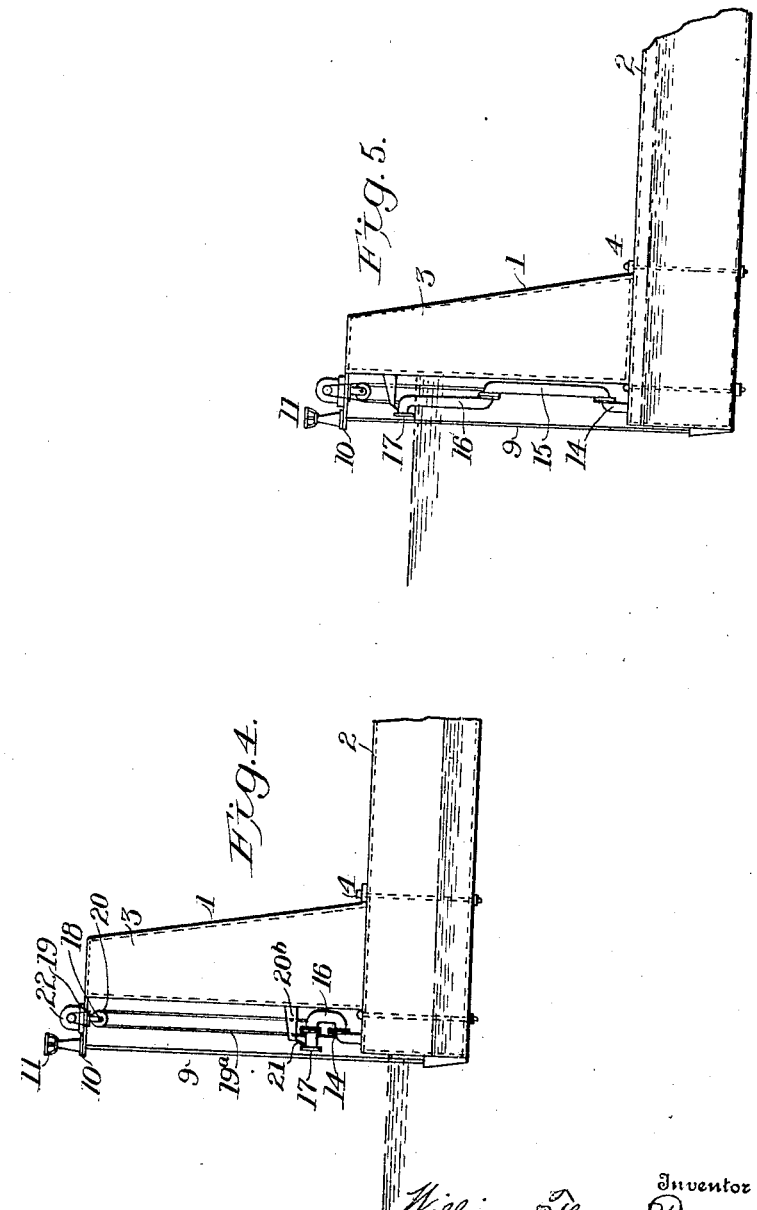

W. T. DONNELLY.
FLOATING DRY DOCK.
APPLICATION FILED JULY 28, 1908.
920,285.
Patented May 4, 1909.
6 SHEETS—SHEET 5.
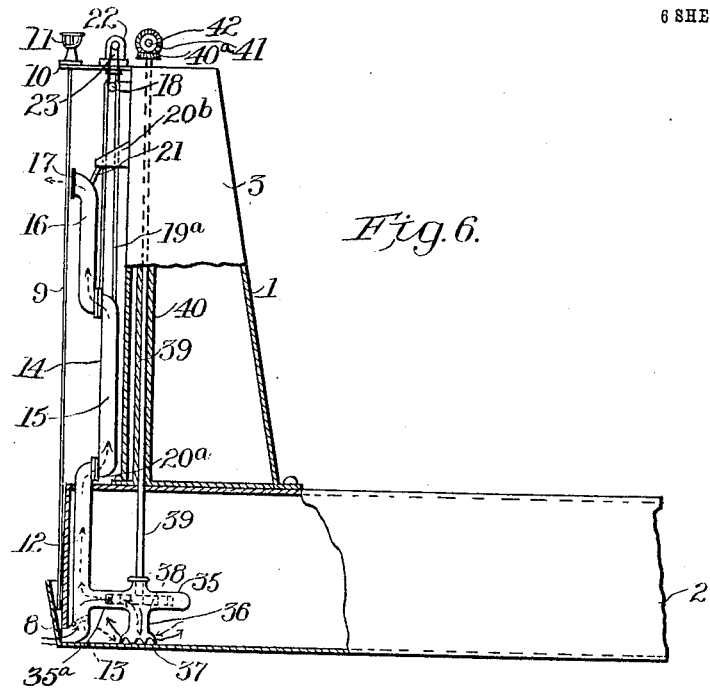
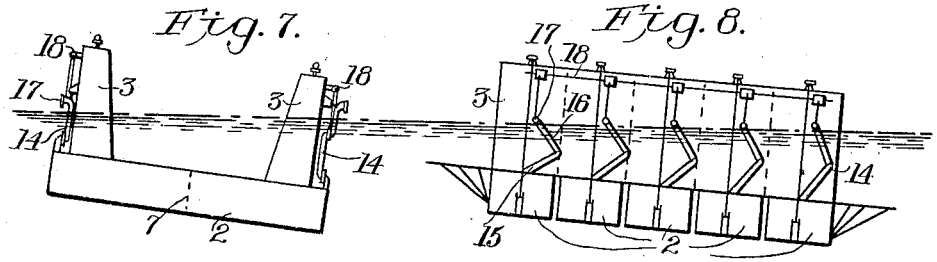

W. T. DONNELLY.
FLOATING DRY DOCK.
APPLICATION FILED JULY 28, 1908.
920,285.
Patented May 4, 1909.
6 SHEETS—SHEET 6.
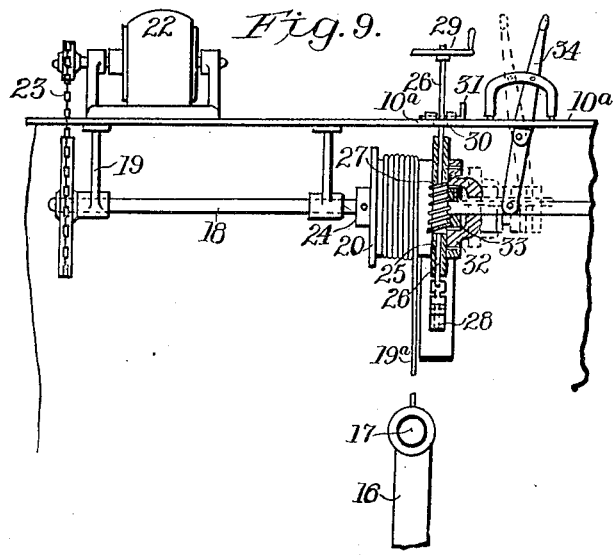
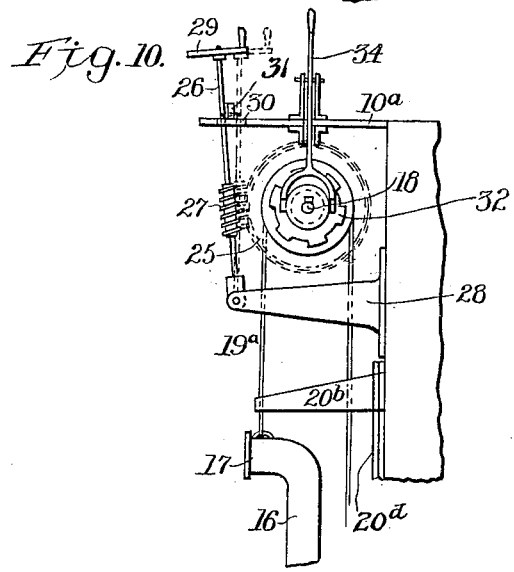
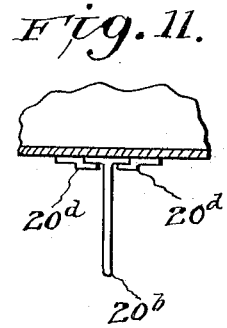

UNITED STATES PATENT OFFICE.

WILLIAM THOMAS DONNELLY, OF BROOKLYN, NEW YORK.

FLOATING DRY-DOCK.

No. 920,285.  Specification of Letters Patent.  Patented May 4, 1909.

Application filed July 28, 1908. Serial No. 445,730.

*To all whom it may concern:*

Be it known that I, WILLIAM THOMAS DONNELLY, a citizen of the United States, residing at Brooklyn, in the county of Kings and State of New York, have invented certain new and useful Improvements in Floating Dry-Docks, of which the following is a specification.

My invention relates to improvements in floating dry-docks.

In all floating dry-docks the safety of the dock and vessel depends upon the proper distribution and control of the pumping power, and as this is one of the important features, if not the most important feature, in connection with a floating dry-dock I have provided for an improvement in the pumping means.

My invention has as its object to accurately control a dock while being raised or lowered, no matter what the position or the size of the vessel may be which it is employed to dock, by providing simple and efficient means for controlling the delivery of water to and exhaust of water from the compartments thereof, whereby water may be delivered to or exhausted from any desired combination of compartments or the dock as a whole, as may be required.

My invention has for its object the control of the delivery and exhaust of water from the various compartments by means of centrifugal pumps.

Another object of my invention is to make of the wings closed compartments, without inlet or outlet valves, and the dimensions of the wings such that when all the pontoons of the dock are completely flooded the descent of the dock will be automatically arrested at the maximum depth for which it is designed.

A still further object is to provide a dry dock which is simple and durable in construction and exceedingly easy to operate under all conditions.

Referring to the drawings: Figure 1 is a side elevation of a floating dry-dock embodying my invention. Fig. 2, a top plan view. Fig. 3, an end elevation. Fig. 4, a side elevation of one side of the dock, showing the position the dock assumes when elevated. Fig. 5, a side elevation of one side of the dock, showing the position the dock assumes when lowered and submerged. Fig. 6, a side view of one of the pontoons, partly in section. Fig. 7, is an end elevation of the dock, showing the position of the several parts when the dock is listed sidewise. Fig. 8, a side elevation of the dock, showing the positions of the several parts when the dock is inclined longitudinally. Fig. 9, is a side elevation, partly in section on an enlarged scale, of the mechanism for effecting a change in level of the discharge outlets. Fig. 10, is an end view of the mechanism shown in Fig. 11. Fig. 11, is a fragmentary sectional view showing the means for slidingly mounting the brackets.

Referring to the drawings in which like numerals of reference denote like parts throughout the several views, 1 represents the floating dry-dock, which as shown is composed of a series of five pontoons 2, but which may comprise a greater or less number, as may be found necessary to meet the different requirements. Side walls or wings 3, which are hollow and made air and water tight, are mounted on the pontoons in the usual manner and secured by suitable bolts 4. The pontoons are also provided with the usual keel-blocks 5 and bilge-blocks 6. The pontoons are each provided with a longitudinal central bulkhead 7 dividing it into two compartments, each provided with an inlet having a flood-gate 8, said flood-gate being opened and closed by means of a rod 9, which is mounted in a bracket 10, projecting laterally from the top of the side wall or wing 3, and said rod being screw-threaded at its upper end and provided with a hand-wheel 11, by which it is operated. In each compartment of the pontoons is located a pipe 12, the upper end of which extends through the deck of the pontoon and the lower end being connected to the inlet and provided with a check valve 13, which opens only in an upward direction, and prevents the egress of water by way of the flood gates.

Each of the pipes 12, is provided with an adjustable water outlet 14, which comprises hinged sections of pipe 15 and 16, the section 15 being hinged at its lower end to the upper end of the pipe 12, and the other section 16, being hinged at its lower end to the upper end of the section 15, while its upper end is provided with a laterally and outwardly extending nozzle or mouth 17, which is designed to always be above the surface of the water floating the dock.

The means for raising and lowering the outlets 14, simultaneously, comprises shafts 18, extending longitudinally on each side of the dock and mounted in hangers 19, secured to lateral projections on the wings and provided with drums or rollers 20, which are loose on the shaft 18, and around each roller is wound a rope or chain 19ª, one end of which passes over a roller 20ª and is secured thereto and the other end being connected to the bracket 20ᵇ, slidably mounted on suitable rails 20ᵈ on the outer wall of the wings, and 21, is a link one end attached to the bracket, while the other end is attached to the top of the hinged section of pipe 16, of the outlets 14.

For turning the shafts 18, a motor 22 is employed, which may be operated by electricity, compressed air, or any other power, and which is operatively connected to a sprocket wheel on the shaft 18, by means of a sprocket chain 23. To keep the drums 20, from moving laterally, sleeves 24 are provided, which are clamped to the shafts 18, on opposite sides of the drums.

To provide means to raise and lower the outlets independently of each other, each drum 20 is provided with a worm gear 25 and a vertical shaft 26, provided with a worm 27, designed to engage said worm-gear, said shaft being pivoted to a bracket 28, extending from the side wall or wing of the dock and being free to turn axially on the bracket 28, and provided with a hand wheel 29 at its upper end, by which it is operated. The shaft 26 passes through an elongated slot 30, in the bracket 10ª, and a slidable latch 31 is provided, for normally holding the shaft 26 and the worm 27 out of engagement with the worm gear 25 of the drum 20. For throwing each of the drums 20 into operation a two part clutch is provided one part 32 of which is formed on the side of the drum 20 and the other part or jaw 33 slidably mounted on the shaft 18, and a forked lever 34 is operatively connected to said jaw for causing the two parts of the clutch to engage or disengage.

To raise or lower one of the outlets independently of the others, the latch 31 is withdrawn and the inclination of the shaft 26 is changed so as to bring the worm 27 into engagement with the worm-gear 25. The forked lever 34 is then moved into the position shown by dotted lines, (see Fig. 9) carrying the jaw 33 with it, and thus releasing the drum 20 from engagement with the shaft 18. Then by turning the hand-wheel in either direction the outlet will be raised to any desired elevation.

In each compartment of the pontoons is located a pump casing 35 having a laterally extending pipe 35ª connected with the pipe 12 and forming a combined water outlet and inlet for the pump to and from the exterior of the compartment through the pipe 12 and a downwardly extending pipe 36 which rests on the bottom of the pontoon and is provided with apertures 37 forming a combined water inlet and outlet for the pump into and from the compartment.

The wheel 38 of a centrifugal pump of any well known form or design, is operatively mounted in each of the casings 35, and 39 is a shaft extending vertically upward from each of said pumps through a tube 40 in each of the wings of the dock. Each shaft 39 of the centrifugal pumps has a bevel gear 40ª at the top which meshes with another bevel gear 41 on a horizontally extending shaft 42, said shaft driving all the centrifugal pumps on each side of the dock, there being a shaft such as 42 on each side of the dock. The shafts 42 may be driven by electricity, compressed air or other power.

The operation of the floating dry-dock in handling a vessel of the full size of the dock is as follows, the dock being considered as raised and ready for sinking, with the keel and bilge blocks prepared for the vessel: The flood gates along both sides of the dock are opened and water allowed to flow into the pipes 12 opening the check valves 13, and flowing through the casings 35, pipes 36, and through the apertures 37 in the bottom edges of said pipes into the pontoons 2, see full line arrows, until the dock has been sunk to the desired depth. When it is desired to pump out or raise the dock the centrifugal pumps are started which reverses the flow of water through the pipes 36, and casings 35 to the pipes 12, and the pipes 36 become the suction side of the pumps, and the tendency to deliver the water through the flood gates close the check valves 13, and the water from the pump is then directed up the pipe 12 and thence through the hinged pipes 15 and 16 and out of the outlets 17, as indicated by dotted arrows. As the mouth of the outlets are always above the surface of the water floating the dock, the pressure within the pipes will keep the check valves closed and the flood gates may be left open until it is found convenient to close them. Attention is called to the fact that there are no valves other than the check valves used. The only outlets from the separate compartments of the pontoons of the dock are those from the hinged pipe outlets, and these the dock master has previously leveled up, so that they are the same distance above the surface of the water and all in plain sight along each side of the dock. These outlets will all deliver water at the same time and to the same amount, and if it is even considered that due to some slight imperfection of construction one outlet may deliver water with a slightly-greater resistance than another, the system provides for a perfect and permanent correction of this by slightly lowering it relative to the others. As the vessel is raised the outlets are lowered by being retracted equally on each side, which motion is very slow and deliberate, never more than one foot in two minutes. The lateral horizontal plane of the dock will ordinarily be maintained by varying the rate at which the outlets on the opposite sides of the dock are lowered. In raising the outlets toward one end it is not necessary that they should all be raised an equal distance, and by graduating them carefully the pumping in each compartment can be made to exactly correspond to the inclination of the dock. In ordinary cases great accuracy in this respect is not necessary, as the strength of the side walls or wings is made such as to distribute a reasonable difference of water level in the pontoons. If there is any danger of the vessel floating at the lighter end, the dock is given the proper rake or inclination by closing the flood-gates at the proper end, and when the rake has been obtained the closed gates are opened and the vessel lowered parallel to her water line until floated. During all the operations at any time the exact relative level of the water in the compartments can be determined by noting the relative level of the outlets when they are in the act of delivering water.

While my invention is shown and described as applied to a floating dry-dock of the well known Rennie type, it will be understood that it is equally applicable to any other type of dock, either solid or sectional.

I do not desire to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. In a floating dry-dock, compartments therein, each compartment provided with a water inlet and a water outlet, a pump having a combined water inlet and outlet into and from the compartment and a combined water inlet and outlet communicating with the water inlet and the water outlet of the compartment and means for preventing water from being discharged from the inlet of the compartment, substantially as described.

2. In a floating dry-dock, compartments therein, each compartment provided with a water inlet and a water outlet, a pipe connecting the water inlet with the water outlet, a valve in said pipe for preventing water from being discharged from the inlet of the compartment and a pump having a combined water inlet and outlet into and from the compartment and a combined water inlet and outlet communicating with the pipe connecting the water inlet and the water outlet of the compartment, substantially as described.

3. In a floating dry-dock, compartments therein, each compartment provided with a water inlet, a water outlet always extending above the surface of the water floating the dock, a pump having a combined water inlet and outlet into and from the compartment and a combined water inlet and outlet communicating with the water inlet and the water outlet of the compartment and means for preventing water from being discharged from the water inlet of the compartment, substantially as described.

4. In a floating dry-dock, compartments therein, each compartment provided with a water inlet and a water outlet always extending above the surface of the water floating the dock, a pipe connecting the water inlet with the water outlet, a valve in said pipe for preventing water from being discharged from the inlet of the compartment and a pump having a combined water inlet and outlet into and from the compartment and a combined water inlet and outlet communicating with the pipe connecting the water inlet and the water outlet of the compartment, substantially as described.

5. In a floating dry-dock, sides, pontoons, compartments in said pontoons each compartment provided with a water inlet and a water outlet, a pump having a combined inlet and outlet into and from the compartment and a combined water inlet and outlet communicating with the water inlet and the water outlet of the compartment and means for preventing water from being discharged from the water inlet of the compartment, substantially as described.

6. In a floating dry-dock, sides, pontoons, compartments in said pontoons, each compartment provided with a water inlet, a water outlet always extending above the surface of the water floating the dock, a pump having a combined water inlet and outlet into and from the compartment and a combined water inlet and outlet communicating with the water inlet and the water outlet of the compartment and means for preventing water from being discharged from the water inlet of the compartment, substantially as described.

In testimony whereof I have signed my name in the presence of two subscribing witnesses.

WILLIAM THOMAS DONNELLY.

Witnesses:
Jos. T. MULLIGAN,
GEO. W. EISENTRANN.